United States Patent
Dong et al.

(10) Patent No.: US 10,934,373 B2
(45) Date of Patent: Mar. 2, 2021

(54) USE OF ORGANOSILANE, AND POLYOLEFIN RESIN AND PREPARATION METHOD THEREOF

(71) Applicants: Institute of Chemistry, Chinese Academy of Sciences, Beijing (CN); University of Chinese Academy of Sciences, Beijing (CN)

(72) Inventors: Jinyong Dong, Beijing (CN); Yawei Qin, Beijing (CN)

(73) Assignees: INSTITUTE OF CHEMISTRY, CHINESE ACADEMY OF SCIENCES, Beijing (CN); UNIVERSITY OF CHINESE ACADEMY OF SCIENCES, Beijing (CN)

( * ) Notice: Subject to any disclaimer, the term of this patent is extended or adjusted under 35 U.S.C. 154(b) by 94 days.

(21) Appl. No.: 15/767,590

(22) PCT Filed: Oct. 12, 2015

(86) PCT No.: PCT/CN2015/091733
§ 371 (c)(1),
(2) Date: Apr. 11, 2018

(87) PCT Pub. No.: WO2017/063116
PCT Pub. Date: Apr. 20, 2017

(65) Prior Publication Data
US 2018/0298125 A1    Oct. 18, 2018

(51) Int. Cl.
| | | |
|---|---|---|
| *C08F 230/08* | (2006.01) | |
| *C08F 210/02* | (2006.01) | |
| *C08F 210/06* | (2006.01) | |
| *C08F 210/08* | (2006.01) | |
| *C08F 210/14* | (2006.01) | |
| *C08F 210/16* | (2006.01) | |
| *C08F 110/06* | (2006.01) | |
| *C08K 5/54* | (2006.01) | |
| *C08J 3/24* | (2006.01) | |
| *C08F 10/06* | (2006.01) | |
| *C08G 77/48* | (2006.01) | |

(52) U.S. Cl.
CPC ............ *C08F 110/06* (2013.01); *C08F 10/06* (2013.01); *C08F 210/02* (2013.01); *C08F 210/06* (2013.01); *C08F 210/08* (2013.01); *C08F 210/14* (2013.01); *C08F 230/085* (2020.02); *C08G 77/48* (2013.01); *C08J 3/24* (2013.01); *C08K 5/54* (2013.01); *C08F 2420/00* (2013.01); *C08F 2810/20* (2013.01)

(58) Field of Classification Search
None
See application file for complete search history.

(56) References Cited

U.S. PATENT DOCUMENTS

| | | |
|---|---|---|
| 4,229,558 A | 10/1980 | Kakogawa et al. |
| 5,045,597 A | 9/1991 | Asanuma et al. |
| 5,081,190 A | 1/1992 | Asanuma et al. |
| 5,550,194 A | 8/1996 | Hoxmeier et al. |
| 5,866,663 A | 2/1999 | Brookhart et al. |
| 2003/0212225 A1 | 11/2003 | Wang et al. |
| 2008/0234448 A1* | 9/2008 | Pratt .................. C08F 6/00 526/71 |

FOREIGN PATENT DOCUMENTS

| | | | |
|---|---|---|---|
| CN | 1057467 A | | 1/1992 |
| CN | 1965004 A | | 5/2007 |
| CN | 103665203 A | | 3/2014 |
| CN | 103665204 A | * | 3/2014 |
| CN | 103665204 A | | 3/2014 |
| CN | 104448063 A | | 3/2015 |
| CN | 104628920 A | * | 5/2015 |
| JP | 61207406 A | | 9/1986 |
| JP | 63238109 A | | 4/1988 |
| JP | S63502285 A | * | 9/1988 |

(Continued)

OTHER PUBLICATIONS

Kaminsky, W. "The Discovery of Metallocene Catalysts and Their Present State of the Art" (2004) J. of Polymer Sci. Part A: Polymer Chemistry 42: 3911-3921.

*Primary Examiner* — Richard A Huhn
(74) *Attorney, Agent, or Firm* — Volpe Koenig

(57) ABSTRACT

Provided are use of organosilane, and polyolefin resin and preparation method thereof. The method of preparing the polyolefin resin comprises: conducting olefin polymerization of olefin monomers in the presence of a catalyst, and adding organosilane to a polymerization system before the olefin polymerization and/or during the olefin polymerization, wherein the organosilane is represented by a general formula of $R^1{}_m SiX_n(OR^2)_k$, wherein $R^1$ is a $C_2$-$C_{20}$ alkyl, and a terminal of $R^1$ has an α-olefin double bond, a norbornene group, a cycloalkene group, or a dicyclopentadiene group; X is a halogen element; $R^2$ is a $C_1$-$C_{20}$ straight chain, a $C_1$-$C_{20}$ branched chain, or an isomerized alkyl group; m is an integer from 1-3; n is an integer from 1-3; k is an integer from 0-2; and m, n, and k satisfy the following condition: m+n+k=4. The polyolefin resin obtained by the above method has higher melt strength and mechanical strength.

6 Claims, No Drawings

(56) References Cited

FOREIGN PATENT DOCUMENTS

| | | |
|---|---|---|
| JP | 1-294720 A2 | 11/1989 |
| JP | 2-153951 A2 | 6/1990 |
| JP | 2003-518139 | 6/2003 |
| JP | 2013-68914 A2 | 4/2013 |
| WO | 9901485 A1 | 1/1999 |
| WO | 2011028523 | 3/2011 |

* cited by examiner

USE OF ORGANOSILANE, AND POLYOLEFIN RESIN AND PREPARATION METHOD THEREOF

CROSS REFERENCE TO RELATED APPLICATION

This application is a 35 USC § 371 National Stage application of International Patent Application No. PCT/CN2015/091733, which was filed Oct. 12, 2015, was entitled "Use of Organic Siloxane, and Polyolefin Resin and Preparation Method Thereof," and is incorporated herein by reference as if fully set forth.

FIELD OF THE INVENTION

The present invention relates to the olefin polymerization field, in particular to a use of organosilane in preparation of a polyolefin resin, a method of preparing a polyolefin resin, and a polyolefin resin prepared by the method.

BACKGROUND OF THE INVENTION

In recent years, though olefin polymerization modifiers that have new structures and new features have been discovered and applied in researches for improving the performance of polyolefin resins continuously, effective catalytic polymerization means for preparing some high-performance polyolefin resins that have wide application prospects are still inadequate. For example, crosslinked polypropylene with high melt strength has wide application prospects in application fields such as blow molding and foaming, but there is still no effective polymerization method to prepare such polypropylene directly in polymerization reactors. For another example, in-reactor polypropylene alloys represented by high impact copolymer polypropylene (hiPP) have great application potentials in fields such as automobile, instrument and equipment, and durable consumer goods, but the in-reactor polypropylene alloy resins have drawbacks such as low interfacial adhesion between polypropylene phase and ethylene-propylene rubber phase, unstable phase separation scale, etc., which result in low melt strength and poor mechanical properties of the in-reactor polypropylene alloy resins and have strong impact on the operational performance of in-reactor the polypropylene alloy resins.

To improve the melt strength and mechanical strength of polypropylene resins, at present, measures such as radiation modification and graft modification, etc. are mainly taken to obtain polypropylene resins having a long-chain branched structure or crosslinked structure, or measures such as introduction of high molecular polypropylene components, inorganic fillers, and copolymerization components, etc. are taken to improve the melt strength and mechanical strength of polypropylene resins. Though those measures can improve the melt strength and mechanical properties of polyolefin resins to some extent, they involve drawbacks such as high production cost and mono-specific product properties, etc.

CONTENT OF THE INVENTION

To overcome the drawbacks that polyolefin resins prepared by the existing method have low melt strength, the present invention provides a use of organosilane in preparation of a polyolefin resin, a method of preparing a polyolefin resin, and a polyolefin resin prepared by the method.

Specifically, the present invention provides a use of organosilane in preparation of a polyolefin resin, wherein the organosilane is represented by a general formula $R^1_m SiX_n (OR^2)_k$, wherein $R^1$ is a $C_2$-$C_{20}$ alkyl group and a terminal of $R^1$ has an α-olefin double bond, a norbornene group, a cycloolefin group, or a dicyclopentadiene group, X is a halogen element, $R^2$ is a $C_1$-$C_{20}$ linear chain, branched chain or isomerized alkyl group, m is an integer within a range of 1-3, n is an integer within a range of 1-3, k is an integer within a range of 0-2, and m+n+k=4.

The present invention further provides a method of preparing a polyolefin resin comprising: conducting an olefin polymerization reaction of olefin monomers in the presence of a catalyst, and adding an organosilane into polymerization reaction system before and/or during the olefin polymerization reaction, wherein the organosilane is represented by a general formula $R^1_m SiX_n (OR^2)_k$, wherein $R^1$ is a $C_2$-$C_{20}$ alkyl group and a terminal of $R^1$ has an α-olefin double bond, a norbornene group, a cycloolefin group, or a dicyclopentadiene group, X is a halogen element, $R^2$ is a $C_1$-$C_{20}$ linear chain, branched chain or isomerized alkyl group, m is an integer within a range of 1-3, n is an integer within a range of 1-3, k is an integer within a range of 0-2, and m+n+k=4.

Furthermore, the present invention further provides a polyolefin resin obtained by the above-mentioned method.

Through in-depth research, the inventor of the present invention has found that the organosilane represented by the general formula $R^1_m SiX_n (OR^2)_k$ behaves quite differently from the organosilane represented by a general formula $Si(OR')_4$ (wherein R' is $C_1$-$C_{20}$ alkyl) and the organohalosilane represented by a general formula $SiX'_4$ (wherein X' is a halogen element) during the olefin polymerization reaction process. If the organosilane represented by the general formula $R^1_m SiX_n (OR^2)_k$ is added into the polymerization reaction system before and/or during the olefin polymerization reaction, a polyolefin resin with higher melt strength and higher mechanical strength can be obtained by polymerization. Furthermore, the method of preparing polyolefin resin provided in the present invention can attain a purpose of adjusting the degree of branching or crosslinking of the obtained polyolefin resins in a controlled manner by adjusting the kinds and the dose of the organosilane, so that a series of polyolefin resins with adjustable melt strength and controllable mechanical properties can be obtained, and even crosslinked polyolefin resins can be obtained, and thereby as-polymerized polyolefin resins with high and diversified performance can be prepared at a low cost.

According to a preferred example of the present invention, if the $R^1$ in the organosilane is a $C_2$-$C_{20}$ alkyl group and a terminal of $R^1$ has an α-olefin double bond, a norbornene group, a cycloolefin group or a dicyclopentadiene group, X is a halogen element, $R^2$ is a $C_1$-$C_{10}$ linear chain, branched chain or isomerized alkyl group, m is 1 or 2, n is 2 or 3, k is 0, and m+n+k=4, or if the $R^1$ is a $C_2$-$C_{18}$ alkyl group and a terminal of $R^1$ has an α-olefin double bond, a norbornene group, a cycloolefin group or a dicyclopentadiene group, X is a halogen element, $R^2$ is a $C_1$-$C_5$ linear chain, branched chain or isomerized alkyl group, m is 1, n is 3, and k is 0, the obtained polyolefin resin has higher melt strength and higher mechanical strength.

Other features and advantages of the present invention will be further detailed in the examples hereunder.

DETAILED DESCRIPTION OF THE EXAMPLES

Hereunder some examples of the present invention will be detailed. It should be understood that the examples described here are only provided to describe and explain the present invention, but shall not be deemed as constituting any limitation to the present invention.

The present invention provides a use of organosilane in preparation of a polyolefin resin, wherein the organosilane is represented by a general formula $R^1{}_m SiX_n(OR^2)_k$, wherein a plurality of $R^1$ in the same general formula may be the same with or different from each other, and may be a $C_2$-$C_{20}$ alkyl group respectively and independently, and a terminal of $R^1$ has an α-olefin double bond, a norbornene group, a cycloolefin group, or a dicyclopentadiene group; a plurality of X in the same general formula may be the same with or different from each other, and may be a halogen element (including fluorine, chlorine, bromine, iodine) respectively and independently; a plurality of $R^2$ in the same general formula may be the same with or different from each other, and may be a $C_1$-$C_{20}$ linear chain, branched chain or isomerized alkyl respectively and independently; m is an integer with a range of 1-3, n is an integer within a range of 1-3, k is an integer within a range of 0-2, and m+n+k=4.

According to the present invention, preferably, a plurality of $R^1$ in the same general formula may be the same with or different from each other, and is a $C_2$-$C_{20}$ alkyl group respectively and independently, and a terminal of $R^1$ has an α-olefin double bond, a norbornene group, a cycloolefin group, or a dicyclopentadiene group; a plurality of X in the same general formula may be the same with or different from each other, and is a halogen element (including fluorine, chlorine, bromine, iodine) respectively and independently; a plurality of $R^2$ in the same general formula may be the same with or different from each other, and is a $C_1$-$C_{10}$ linear chain, branched chain or isomerized alkyl group respectively and independently; m is 1 or 2, n is 2 or 3, k is 0, and m+n+k=4. More preferably, a plurality of $R^1$ in the same general formula may be the same with or different from each other, and is a $C_2$-$C_{18}$ alkyl group respectively and independently, and a terminal of $R^1$ has an α-olefin double bond, a norbornene group, a cycloolefin group, or a dicyclopentadiene group; a plurality of X in the same general formula may be the same with or different from each other, and is a halogen element (including fluorine, chlorine, bromine, iodine) respectively and independently; a plurality of $R^2$ in the same general formula may be the same with or different from each other, and is a $C_1$-$C_5$ linear chain, branched chain or isomerized alkyl group respectively and independently; m is 1, n is 3, and k is 0. If the above-mentioned preferred organosilane is used as a modifier to prepare a polyolefin resin, the melt strength and mechanical strength of the obtained polyolefin resin can be further improved.

In the case that the terminal of $R^1$ has an α-olefin double bond ($CH_2$=CH—), there is no particular restriction on the structure of the middle part of $R^1$ except for the α-olefin double bond; specifically, the middle part may include a linear chain alkyl group (including double bonds, triple bonds, etc.) or its isomers. In that case, examples of the organosilane include, but are not limited to at least one of 7-octenyl trichlorosilane, 5-hexenyl trichlorosilane, allyl trichlorosilane, di-(7-octenyl) dichlorosilane, di-(allyl) dichlorosilane, etc.

In the case that the terminal of $R^1$ has a norbornene group, preferably, the structure of $R^1$ is represented by the following Formula (1):

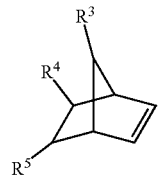

Formula (1)

Wherein, the group bonded to silicon atom may be $R^3$, $R^4$, or $R^5$, and $R^3$, $R^4$ and $R^5$ are H or $C_1$-$C_{10}$ alkyl (including alkenyl, alkynyl, cycloalkenyl and others) respectively and independently, but are not limited to specific structures, including linear chain alkyl or its isomers. For example, if $R^1$ has the structure represented by Formula (1), $R^3$ is a hydrogen atom, $R^4$ is ethylidene and is bonded to the silicon atom, $R^5$ is ethyl, m=1, n=3, k=0, and X is chlorine, the organosilane is 2-(5-ethylidene-2-norbornene) ethyl trichlorosilane.

If the terminal of $R^1$ has a cycloolefin group, the carbon number of the cycloolefin group may be 3-10, the number of double bonds in the cycloolefin group may be 1-3, the carbon number of the alkyl chain that connects the cycloolefin group with the silicon atom may be 1-10, and the alkyl chain includes linear chain alkyl or its isomers. Furthermore, the ring of the cycloolefin group may have a branch chain, which preferably is $C_1$-$C_5$ alkyl. In that case, the examples of the organosilane include, but are not limited to 2-(3-cyclohexenyl) ethyl trichlorosilane and/or 4-(2,7-cyclooctadiene) butyl trichlorosilane.

In the case that the terminal of $R^1$ has a dicyclopentadiene group, preferably the structure of $R^1$ is represented by the following Formula (2):

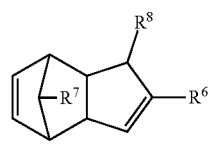

Formula (2)

Wherein, the group bonded to silicon atom may be $R^6$, $R^7$, or $R^8$, and $R^6$, $R^7$ and $R^8$ are H or $C_1$-$C_{10}$ alkyl respectively and independently, but are not limited to specific structures, including linear chain alkyl or its isomers. For example, if $R^1$ has the structure represented by Formula (2), $R^6$ and $R^7$ are hydrogen atoms, $R^8$ is ethylidene and is bonded to the silicon atom, m=1, n=3, k=0, and X is chlorine, the organosilane is 2-(dicyclopentadiene) ethylidene trichlorosilane.

As described above, the examples of the organosilane include, but are not limited to at least one of 7-octenyl trichlorosilane, 5-hexenyl trichlorosilane, allyl trichlorosilane, di-(7-octenyl) dichlorosilane, di-(allyl) dichlorosilane, 2-(5-ethylidene-2-norbornene) ethyl trichlorosilane, 2-(3-cyclohexenyl) ethyl trichlorosilane, 4-(2,7-cyclooctadiene) butyl trichlorosilane, and 2-(dicyclopentadiene) ethylidene trichlorosilane. Preferably, the organosilane is at least one of 7-octenyl trichlorosilane, 5-hexenyl trichlorosilane, allyl trichlorosilane, 2-(5-ethylidene-2-norbornene) ethyl trichlorosilane, 2-(3-cyclohexenyl) ethyl trichlorosilane, 4-(2,7-cyclooctadiene) butyl trichlorosilane, and 2-(dicyclopentadiene) ethylidene trichlorosilane. If the above mentioned preferred organosilane is used as a modifier to prepare a polyolefin resin, the melt strength and mechanical strength of the obtained polyolefin resin can be further improved.

The method of preparing the polyolefin resin provided in the present invention comprises: conducting an olefin polymerization reaction of olefin monomers in the presence of a catalyst, and adding an organosilane into polymerization reaction system before and/or during the olefin polymerization reaction, wherein the organosilane is represented by a general formula $R^1{}_mSiX_n(OR^2)_k$, wherein $R^1$ is $C_2$-$C_{20}$ alkyl and a terminal of $R^1$ has an α-olefin double bond, a norbornene group, a cycloolefin group, or a dicyclopentadiene group, X is a halogen element, $R^2$ is a $C_1$-$C_{20}$ linear chain, branched chain or isomerized alkyl group, m is an integer within a range of 1-3, n is an integer within a range of 1-3, k is an integer within a range of 0-2, and m+n+k=4.

Moreover, the specific selection of the organosilane has been described above, and will not be further detailed here.

There is no particular restriction on the dose of the organosilane in the present invention. Preferably, in relation to 100 pbw olefin monomers, the dose of the organosilane is 0.0001-20 pbw, further preferably is 0.0001-5 pbw, more preferably is 0.0005-1 pbw, and optimally is 0.001-0.5 pbw. Thus, the melt strength and mechanical strength of the obtained polyolefin resin can be further improved.

A main improvement in the method of preparing the polyolefin resin provided in the present invention lies in that the organosilane represented by the general formula $R^1{}_mSiX_n(OR^2)_k$ is added into polymerization reaction system before and/or during the olefin polymerization reaction, while the kinds of the olefin monomer and catalyst and the methods and conditions of the olefin polymerization reaction may be conventional choices in the art.

For example, the olefin monomer may be any monomer that can perform an olefin polymerization reaction in the prior art. Specifically, the olefin monomer may be ethylene and/or α-olefin. Wherein, the α-olefin may be any monoolefin with a double bond at a terminal of the molecular chain. For example, the α-olefin may be at least one of propylene, 1-butylene, 1-pentene, 1-hexylene, and 1-octylene. The polyolefin resin obtained through the olefin polymerization reaction may be homopolymerized polyolefin resin, copolymerized polyolefin resin, in-reactor polyolefin alloy or etc. In the case that the polyolefin resin is a copolymerized polyolefin resin, the content of comonomer in the olefin monomer may be a conventional choice in the art, and will not be further detailed here.

The catalyst may be any substance that can be used to catalyze the olefin monomer to perform a polymerization reaction in the prior art. Examples of the catalyst include, but are not limited to at least one of Ziegler-Natta catalyst, metallocene catalyst, and non-metallocene catalyst. Wherein, the specific compositions of those catalysts are well known to those skilled in the art. For example, the Ziegler-Natta catalyst may be an $MgCl_2$ supported catalyst system, $VOCl_3$—$AlEt_2Cl$ catalyst system, etc. Specifically, the $MgCl_2$ supported catalyst system usually contains $MgCl_2$, $TiCl_4$, alkyl aluminum and/or alkoxy aluminum, and optional internal electron donor and/or external electron donor. The specific composition is well known to those skilled in the art, and will not be detailed further here.

There is no particular restriction on the conditions of the olefin polymerization reaction in the present invention. Usually, the conditions may include (a) polymerization temperature in the range of 30–90° C., preferably 40-80° C.; (b) polymerization pressure in the range of 1-10 atm, preferably 1-7 atm; and (c) polymerization time in the range of 0.05-10 h, preferably 0.05-2 h. In the present invention, the polymerization pressure refers to gauge pressure. Furthermore, the polymerization reaction may be slurry polymerization reaction or bulk polymerization reaction. If the polymerization reaction is a slurry polymerization reaction, the polymerization reaction should be executed in the presence of an organic solvent. The organic solvent may be $C_5$-$C_{10}$ alkane or $C_6$-$C_8$ aromatics, wherein, the $C_5$-$C_{10}$ alkane preferably is at least one of heptane, n-hexane, and cyclohexane, and the $C_6$-$C_8$ aromatics preferably is methyl benzene. Moreover, the dose of the organic solvent may be a conventional choice in the art, and will not be further detailed here.

Furthermore, to adjust the melt index of the polyolefin resin, generally, hydrogen may be charged into the polymerization reaction system during the polyolefin resin preparation process. In relation to 100 pbw olefin monomer, the dose of the hydrogen may be 0-10 pbw, and preferably is 0-5 pbw.

According to the method of preparing the polyolefin resin provided in the present invention, preferably, the method further comprises: washing the product of the olefin polymerization reaction with water and/or alcohol at 20-120° C. after the olefin polymerization reaction is finished, so that the obtained product of the olefin polymerization reaction has a branched or crosslinked structure to some degree, and thereby the melt strength and mechanical strength can be further improved. Wherein, the alcohol may be a conventional choice in the art. Examples of the alcohol include, but are not limited to at least one of methanol, ethanol, n-propanol, isopropanol, n-butanol, etc.

Furthermore, the present invention further provides a polyolefin resin obtained by the above-mentioned method.

The present invention hereunder will be detailed in examples.

In the following examples and reference examples, the gel content in the polyolefin resin is measured with the following method.

The polyolefin resin is dried in an vacuum drying oven at 50° C. till the weight doesn't change any more, the dry polymer is weighed and the weight is denoted as $W_1$, then the dried polyolefin resin is dissolved in dimethyl benzene at 135° C. while the solution is oscillated till the in-reactor polyolefin alloy is dissolved extensively, the solution is filtered through a 200-mesh stainless steel screen, the undissolved polymer left on the stainless steel screen is collected, and then dried in a vacuum drying oven at 100° C. for 4 h, then the dry polymer is weighed and the weight is denoted as $W_2$; then the gel content in the polyolefin resin is calculated with the following formula:

$$\text{Gel content (wt. \%)}=(W_2/W_1) \times 100 \text{ (wt. \%)}.$$

EXAMPLE 1

This example is provided to describe the method of preparing the polyolefin resin provided in the present invention.

Slurry polymerization: In a vacuum state, 450 g gaseous propylene monomer is charged into a reactor, then 50 mL hexane, 3 mL heptane solution that contains 5.5 mmol triethyl aluminum, 0.1 mL 7-octenyl trichlorosilane, and 20 mg olefin polymerization catalyst ($MgCl_2/TiCl_4$/BMMF, wherein, BMMF is an internal electron donor 9,9-dimethoxy fluorene, and the mass ratio of $MgCl_2$ to $TiCl_4$ to BMMF is 80:12:8) are added into the reactor in sequence, and the pressure in the reactor is controlled at 5.0 atm, the reaction temperature is controlled at 60° C., and the mixture in the reactor is held under those conditions for 0.5 h for polymerization reaction; after the polymerization is finished, acidified ethanol is added to terminate the polymerization reaction, and then the product is washed with 60° C. deionized water and 50° C. ethanol for 3 times respectively, and finally the product is vacuum-dried at 60° C.; thus, 20.0 g homopolymerized polypropylene resin is obtained. Measured in a detection process, the concentration of 7-octenyl trichlorosilane in the homopolymerized polypropylene resin is 5,000 ppm, the homopolymerized polypropylene resin has a branched or crosslinked structure, and the gel content in the homopolymerized polypropylene resin is 20 wt. %.

EXAMPLE 2

This example is provided to describe the method of preparing the polyolefin resin provided in the present invention.

Bulk polymerization: In a vacuum state, 450 g liquid propylene is loaded into a reactor, then 0.25 mol triethyl aluminum, 0.005 g hydrogen, 0.02 mL 7-octenyl trichlorosilane and 18 mg olefin polymerization catalyst ($MgCl_2/TiCl_4$/BMMF, wherein, the mass ratio of $MgCl_2$ to $TiCl_4$ to BMMF is 80:12:8) are added into the reactor in sequence, the reaction temperature is controlled at 70° C., and the mixture in the reactor is held at the temperature for 30 min for polymerization reaction; after the polymerization is finished, the gas in the reactor is vented, and the product in the reactor is discharged; then, the obtained product is washed with hot water (90° C.), and is vacuum-dried at 60° C.; thus, a homopolymerized polypropylene resin is obtained. Measured in a detection process, the concentration of 7-octenyl trichlorosilane in the homopolymerized polypropylene resin is 57 ppm, the homopolymerized polypropylene resin has a branched or crosslinked structure, and the gel content in the homopolymerized polypropylene resin is 1.1 wt. %.

EXAMPLE 3

This example is provided to describe the method of preparing the polyolefin resin provided in the present invention.

The polyolefin resin is prepared by the method described in Example 2, but the 7-octenyl trichlorosilane is replaced with 7-octenyl dimethoxy chlorosilane in the same volume; thus, a homopolymerized polypropylene resin is obtained. Measured in a detection process, the concentration of 7-octenyl dimethoxy trichlorosilane in the homopolymerized polypropylene resin is 250 ppm, the homopolymerized polypropylene resin has a branched or crosslinked structure, and the gel content in the homopolymerized polypropylene resin is 1 wt. %.

COMPARATIVE EXAMPLE 1

This comparative example is provided to describe the method of preparing a reference polyolefin resin.

The polyolefin resin is prepared by the method described in Example 2, but no 7-octenyl trichlorosilane is added; thus, a reference homopolymerized polypropylene resin is obtained.

COMPARATIVE EXAMPLE 2

This comparative example is provided to describe the method of preparing a reference polyolefin resin.

The polyolefin resin is prepared by the method described in Example 2, but the 7-octenyl trichlorosilane is replaced with tetrachlorosilane in the same volume; thus, a reference homopolymerized polypropylene resin is obtained.

COMPARATIVE EXAMPLE 3

This comparative example is provided to describe the method of preparing a reference polyolefin resin.

The polyolefin resin is prepared by the method described in Example 2, but the 7-octenyl trichlorosilane is replaced with tetramethoxysilane in the same volume; thus, a reference homopolymerized polypropylene resin is obtained.

EXAMPLE 4

This example is provided to describe the method of preparing the polyolefin resin provided in the present invention.

Bulk polymerization: In a vacuum state, 450 g liquid propylene is loaded into a reactor, then 0.25 mol triethyl aluminum, 0.025 mL methyl cyclohexyl dimethoxy silicane, 0.05 mL 7-octenyl trichlorosilane, and 18 mg olefin polymerization catalyst ($MgCl_2/TiCl_4$/DIBP, wherein, DIBP is internal electron donor diisobutyl o-phthalate, the mass ratio of $MgCl_2$ to $TiCl_4$ to DIBP is 85:8:7) are added into the reactor in sequence, the reaction temperature is controlled at 70° C., and the mixture in the reactor is held at the temperature for 30 min for polymerization reaction; after the polymerization is finished, the gas in the reactor is vented, and the product in the reactor is discharged; thus, 300 g homopolymerized polypropylene resin is obtained. Measured in a detection process, the concentration of 7-octenyl trichlorosilane in the homopolymerized polypropylene resin is 167 ppm, the homopolymerized polypropylene resin has a branched or crosslinked structure, and the gel content in the homopolymerized polypropylene resin is 0.2 wt. %.

EXAMPLE 5

This example is provided to describe the method of preparing the polyolefin resin provided in the present invention.

Bulk polymerization: In a vacuum state, 450 g liquid propylene is loaded into a reactor, then 0.25 mol methyl-aluminoxane, 0.02 mL 7-octenyl trichlorosilane, and 0.0025 g transitional metal compound rac-$Me_2Si(2\text{-Me-4-PhInd})_2ZrCl_2$ (wherein, rac-represents "racemized", Me is methyl, Ph is phenyl, and Ind is indentyl) are added into the reactor in sequence, the reaction temperature is controlled at 70° C., the mixture in the reactor is held at the temperature for 30 min for polymerization reaction; after the polymerization is finished, the gas in the reactor is vented, and the product is discharged from the reactor; thus, 300 g homopolymerized polypropylene resin is obtained. Measured in a detection process, the concentration of 7-octenyl trichlorosilane in the homopolymerized polypropylene resin is 67 ppm, the homopolymerized polypropylene resin has a branched or crosslinked structure, and the gel content in the homopolymerized polypropylene resin is 15.2 wt. %.

EXAMPLE 6

This example is provided to describe the method of preparing the polyolefin resin provided in the present invention.

Bulk polymerization: In a vacuum state, 450 g liquid propylene is loaded into a reactor, then 0.25 mol alkylaluminoxane, 0.01 mL 7-octenyl trichlorosilane, and 0.0025 g transitional metal compound Me$_2$C(Cp)(Flu)ZrCl$_2$ (wherein, Me is methyl, Cp is cyclopentadienyl, and Flu is fluorenyl) are added into the reactor in sequence, the reaction temperature is controlled at 70° C., the mixture in the reactor is held at the temperature for 30 min for polymerization reaction; after the polymerization is finished, the gas in the reactor is vented, and the product is discharged from the reactor; thus, 360 g homopolymerized polypropylene resin is obtained. Measured in a detection process, the concentration of 7-octenyl trichlorosilane in the homopolymerized polypropylene resin is 28 ppm, the homopolymerized polypropylene resin has a branched or crosslinked structure, and the gel content in the homopolymerized polypropylene resin is 12.0 wt. %.

EXAMPLE 7

This example is provided to describe the method of preparing the polyolefin resin provided in the present invention.

The polyolefin resin is prepared by the method described in Example 6, but the 7-octenyl trichlorosilane is replaced with 2-(5-ethylidene-2-norbornene) ethyl trichlorosilane in the same volume; thus, a homopolymerized polypropylene resin is obtained. Measured in a detection process, the concentration of 2-(5-ethylidene-2-norbornene) ethyl trichlorosilane in the homopolymerized polypropylene resin is 150 ppm, the homopolymerized polypropylene resin has a branched or crosslinked structure, and the gel content in the homopolymerized polypropylene resin is 8.5 wt. %.

EXAMPLE 8

This example is provided to describe the method of preparing the polyolefin resin provided in the present invention.

The polyolefin resin is prepared by the method described in Example 6, but the 7-octenyl trichlorosilane is replaced with 2-(3-cyclohexenyl) ethyl trichlorosilane in the same volume; thus, a homopolymerized polypropylene resin is obtained. Measured in a detection process, the concentration of 2-(3-cyclohexenyl) ethyl trichlorosilane in the homopolymerized polypropylene resin is 60 ppm, the homopolymerized polypropylene resin has a branched or crosslinked structure, and the gel content in the homopolymerized polypropylene resin is 5.2 wt. %.

EXAMPLE 9

This example is provided to describe the method of preparing the polyolefin resin provided in the present invention.

The polyolefin resin is prepared by the method described in Example 6, but the 7-octenyl trichlorosilane is replaced with 2-(dicyclopentadiene) ethylidene trichlorosilane in the same volume; thus, a homopolymerized polypropylene resin is obtained. Measured in a detection process, the concentration of 2-(dicyclopentadiene) ethylidene trichlorosilane in the homopolymerized polypropylene resin is 120 ppm, the homopolymerized polypropylene resin has a branched or crosslinked structure, and the gel content in the homopolymerized polypropylene resin is 6.0 wt. %.

Test Cases

The test cases are provided to describe the tests of the properties of the polyolefin resin.

(1) Test of Melt Strength

The experimental apparatus for determining melt strength consists of a single screw extrusion machine equipped with capillary tubes and a Gottfert Rheotens melt strength tester. First, melt mass of polyolefin resin of which the melt strength is to be tested is extruded through an outlet die of the extrusion machine, and then the obtained extruded melt beam sample is drawn by two rollers moving in opposite directions on an equalizing beam. The tensile force suffered by the melt beam when the melt beam is drawn is a function of roller speed and time. The rollers are accelerated and rotated at uniform acceleration, till the melt beam is broken. The tensile force suffered by the melt beam at the time the melt beam is broken is defined as melt strength. The obtained result is shown in Table 1.

(2) Test of Mechanical Properties

The impact strength is measured with the method specified in ASTM D256A, and the result is shown in Table 1.

The tensile strength is measured with the method specified in ISO527-2-5A, and the result is shown in Table 1.

The flexural modulus is measured with the method specified in ASTM 638-V, and the result is shown in Table 1.

TABLE 1

| No. | Melt strength, cN | Impact strength, kJ/m$^2$ | Tensile strength, MPa | Flexural modulus, MPa |
|---|---|---|---|---|
| Example 1 | 650 | 15.2 | 74.5 | 1600 |
| Example 2 | 150 | 7.2 | 64.5 | 1460 |
| Example 3 | 12.0 | 6.9 | 35.6 | 1260 |
| Comparative Example 1 | 9.0 | 2.1 | 32.2 | 1200 |
| Comparative Example 2 | 8.9 | 1.8 | 32.5 | 1210 |
| Comparative Example 3 | 8.0 | 1.3 | 30.8 | 1090 |
| Example 4 | 27 | 5.4 | 40.2 | 1300 |
| Example 5 | 520 | 10.8 | 59.0 | 1450 |
| Example 6 | 480 | 11.5 | 46.0 | 1320 |
| Example 7 | 75.0 | 15.0 | 44.2 | 1350 |
| Example 8 | 48.0 | 10.0 | 41.2 | 1450 |
| Example 9 | 50.0 | 13.6 | 44.0 | 1470 |

It is seen from the above result that: the polyolefin resin obtained by the method provided in the present invention has higher melt strength and higher mechanical strength. It is seen from the comparison between Example 2 and Example 3 that, if the R$^1$ in the organosilane is a C$_2$-C$_{18}$ alkyl group and a the terminal of R$^1$ has an α-olefin double bond, a norbornene group, a cycloolefin group, or a dicyclopentadiene group, X is a halogen element, R$^2$ is a C$_1$-C$_5$ linear chain, branched chain or isomerized alkyl group, m is 1, n is 3, and k is 0, the obtained polyolefin resin has higher melt strength and higher mechanical strength. It is seen from the comparison between Example 3 and Comparative Example 2 and 3 that, the organosilane provided in the present invention behaves differently from silicon tetrahlaide and tetraalkoxysilane in the olefin polymerization reaction process, and the polyolefin resin obtained with the organosilane provided in the present invention has higher melt strength and higher mechanical strength.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the scope of protection of the present invention.

In addition, it should be noted that the specific technical features described in the above embodiments can be combined in any appropriate form, provided that there is no conflict. To avoid unnecessary repetition, the possible combinations are not described specifically in the present invention.

Moreover, the different embodiments of the present invention can be combined freely as required, as long as the combinations don't deviate from the ideal and spirit of the present invention. However, such combinations shall also be deemed as falling into the scope disclosed in the present invention.

The invention claimed is:

1. A method of preparing a polyolefin resin comprising: conducting an olefin polymerization reaction of olefin monomers in the presence of a catalyst, and adding an organosilane during the olefin polymerization reaction, wherein the organosilane is represented by a general formula $R^1{}_m SiX_n (OR^2)_k$, wherein $R^1$ is a $C_2$-$C_{20}$ alkyl group and a terminal of $R^1$ has an α-olefin double bond, a norbornene group, a cycloolefin group, or a dicyclopentadiene group, X is a halogen element, $R^2$ is a $C_1$-$C_{20}$ linear chain, branched chain or isomerized alkyl group, m is an integer within a range of 1-3, n is an integer within a range of 1-3, k is an integer within a range of 0-2, and m+n+k=4, wherein the catalyst is a metallocene catalyst, the organosilane is at least one of 2-(5-ethylidene-2-norbornenyl)ethyl trichlorosilane, 2-(3-cyclohexenyl) ethyl trichlorosilane, 4-(2,7-cyclooctathenyl)butyl trichlorosilane, and 2-(dicyclopentathenyl)ethylidene trichlorosilane, which is represented by the following Formula (3):

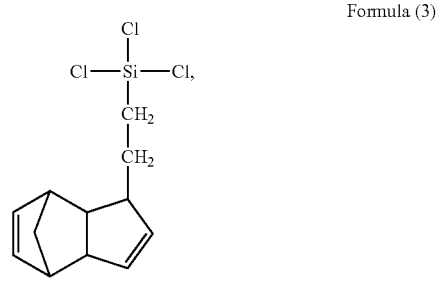 [SMILES: Cl[Si](Cl)(Cl)CCC1C=CC2C3C=CC(C3)C12]

Formula (3)

and in relation to 100 pbw olefin monomers, the dose of the organosilane is 0.0005-1 pbw.

2. The method according to claim 1, wherein in relation to 100 pbw olefin monomers, the dose of the organosilane is 0.0001-0.5 pbw.

3. The method according to claim 1 further comprising: washing the product obtained from the olefin polymerization reaction with water and/or alcohol at 20-120° C., after the olefin polymerization reaction is finished.

4. The method according to claim 3, wherein the α-olefin is at least one of propylene, 1-butylene, 1-pentene, 1-hexylene, and 1-octylene.

5. The method according to claim 1, wherein the olefin monomer is ethylene and/or α-olefin.

6. A polyolefin resin prepared by the method according to claim 1.

* * * * *